(12) United States Patent
Singh et al.

(10) Patent No.: US 8,824,338 B2
(45) Date of Patent: Sep. 2, 2014

(54) DISTRIBUTED SPANNING TREE PROTOCOL

(75) Inventors: Bijendra Singh, Plano, TX (US);
Maitreya Mukhopadhyay, Allen, TX (US); D. Michael Colven, Dallas, TX (US); Albert Smith, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 13/426,992

(22) Filed: Mar. 22, 2012

(65) Prior Publication Data

US 2013/0250815 A1  Sep. 26, 2013

(51) Int. Cl.
*H04L 12/28* (2006.01)

(52) U.S. Cl.
USPC ....... 370/256; 370/235; 370/395.32; 370/408

(58) Field of Classification Search
USPC .............................. 370/256, 408, 235, 395.32
See application file for complete search history.

(56) References Cited

U.S. PATENT DOCUMENTS

| | | | | |
|---|---|---|---|---|
| 5,677,910 A * | 10/1997 | Delaney | | 370/402 |
| 6,122,283 A * | 9/2000 | Lee | | 370/408 |
| 6,246,689 B1 * | 6/2001 | Shavitt | | 370/406 |
| 6,578,086 B1 * | 6/2003 | Regan et al. | | 709/242 |
| 6,993,024 B1 * | 1/2006 | McDermott et al. | | 370/390 |
| 7,558,878 B2 * | 7/2009 | Kaluve et al. | | 709/242 |
| 7,848,264 B1 * | 12/2010 | Gai et al. | | 370/256 |
| 8,238,245 B2 * | 8/2012 | Bragg et al. | | 370/408 |
| 8,462,668 B2 * | 6/2013 | Kuo et al. | | 370/255 |
| 8,582,467 B2 * | 11/2013 | Hirota et al. | | 370/254 |
| 2003/0193959 A1 * | 10/2003 | Lui et al. | | 370/401 |
| 2003/0225908 A1 * | 12/2003 | Srinivasan et al. | | 709/243 |
| 2004/0179524 A1 * | 9/2004 | Sasagawa et al. | | 370/389 |
| 2005/0259646 A1 * | 11/2005 | Smith et al. | | 370/389 |
| 2007/0008958 A1 * | 1/2007 | Clemm et al. | | 370/352 |
| 2007/0124498 A1 * | 5/2007 | Kaluve et al. | | 709/242 |
| 2009/0219836 A1 * | 9/2009 | Khan et al. | | 370/256 |
| 2011/0116366 A1 * | 5/2011 | Smith et al. | | 370/225 |
| 2012/0005371 A1 * | 1/2012 | Ravindran et al. | | 709/242 |
| 2013/0051218 A1 * | 2/2013 | Tallet et al. | | 370/218 |

* cited by examiner

*Primary Examiner* — Ricky Ngo
*Assistant Examiner* — Dewanda Samuel
(74) *Attorney, Agent, or Firm* — Maschoff Brennan

(57) ABSTRACT

A network element coupled to a communication network is described. The network element includes multiple switching units. The switching units may be configured to independently implement a Spanning Tree Protocol (xSTP) processing in a completely distributed manner including each of the switching units independently calculating an external spanning tree for the network element in the communication network. The network element may act as a single bridge to other network elements in a bridging domain of the communication network.

21 Claims, 8 Drawing Sheets

DISTRIBUTED SPANNING TREE PROTOCOL

FIELD

The embodiments discussed herein are related to network traffic control.

BACKGROUND

In telecommunications, a Layer 2 (L2) switch may use addresses for computers and other networked electronic devices for sending and receiving packets of information. L2 forwarding traditionally follows Institute of Electrical and Electronic Engineers (IEEE) standards to provide emulated local area network (ELAN) services using bridging. In L2 bridging, methods such as standard Spanning Tree Protocol (STP) may provide a way for the local area network to maintain redundant links while preventing bridge loops. Variations of STP include rapid spanning tree protocol (RSTP) and multiple spanning tree protocol (MSTP).

In implementations of STP, RSTP and MSTP, table entries in an L2 switch forwarding table may be created for various destinations, where each entry corresponds to a path to the destination, based on the active links that exist through the network. If the L2 switch receives a packet, it may forward the packet to a destination coupled to the active links, based on the information in the table entries about where the destination is located. If one of the active links goes down, a new path may be calculated for the various addresses based on the existing active links.

In 802.1ad compliant switching systems, xSTP is implemented in a centralized format. In such a switching system with a distributed architecture including multiple individual switching units, it is difficult to scale to a large number of switching units because the xSTP protocol is processor-intensive and becomes increasingly processor-intensive with increasing switching units.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a network element is coupled to a communication network. The network element includes multiple switching units. The switching units may be configured to independently implement xSTP processing in a completely distributed manner including each of the switching units independently calculating an external spanning tree for the network element in the communication network. The network element may act as a single bridge to other network elements in a bridging domain of the communication network.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present invention will be explained with reference to the accompanying drawings.

Figure 1:
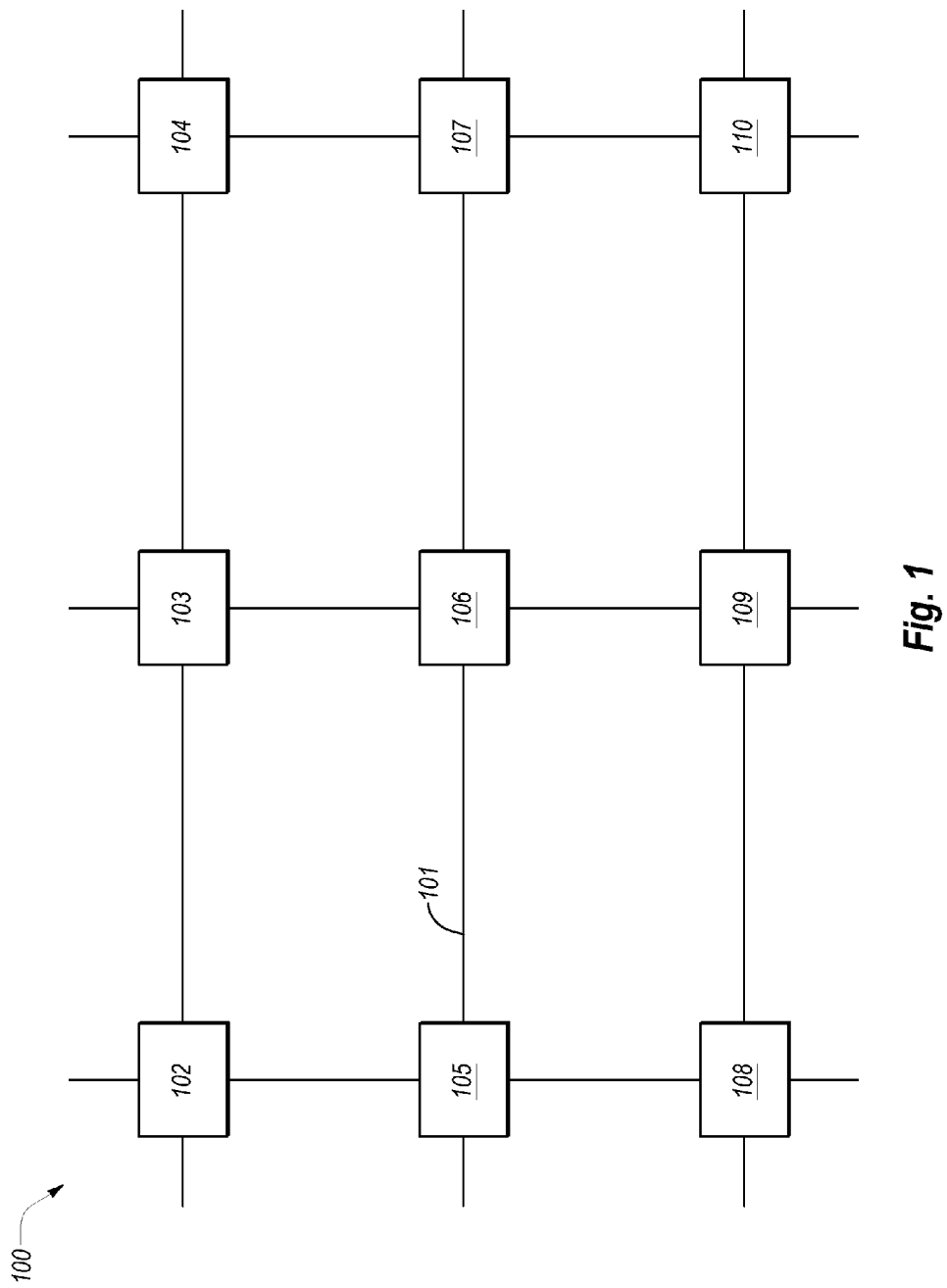
FIG. 1 is a block diagram of an example network in which distributed xSTP may be implemented.

FIG. 1 is a block diagram of an example network 100 in which distributed xSTP may be implemented, arranged in accordance with at least some embodiments described herein. As used herein, xSTP may generically refer to a Spanning Tree Protocol, including any one of standard Spanning Tree Protocol (STP), Rapid Spanning Tree Protocol (RSTP), Multiple Spanning Tree Protocol (MSTP), or variations thereof.

Generally, the network 100 may include transmission media 101 configured to communicatively couple network elements 102-110 together. Any configuration of any number of network elements 102-110 and other devices may form the network 100. In addition, the network 100 may be integrated into and/or form a portion of one or more other networks. Although the network 100 is shown in a particular topological configuration, the network 100 may generally be configured with any suitable topological configuration, such as a ring network, a point-to-point network, a mesh network, or the like or any combination thereof. The network 100 may be a portion of a local area network (LAN) or a wide area network (WAN), for example.

The transmission media 101 are configured to transport data-carrying signals communicated by the network elements 102-110 throughout the network 100. Each transmission medium 101 may include any one or more of an optical fiber, an Ethernet cable, a Ti cable, a WiFi signal, a Bluetooth signal, or the like.

Each of the network elements 102-110 may include, but is not limited to, a packet optical networking platform, an Ethernet switch, a multi-function Ethernet aggregation network element, or other suitable network element.

The network 100 is configured to communicate data, which may be referred to as traffic, data traffic, or data streams, over the transmission media 101. As used herein, "data" means information transmitted, stored, or sorted in the network 100. The data may be transmitted over transmission media 101 in the form of optical or electrical signals configured to represent audio, video, and/or textual data, for example. The data may also be real-time or non-real-time data. The data may be communicated via any suitable communications protocol, including, without limitation, the Open Systems Interconnection (OSI) standard and Internet Protocol (IP).

The data communicated in the network 100 may be structured in any appropriate manner including, but not limited to, being structured in frames, packets, or in an unstructured bit stream. In general, certain types of data are transmitted in packets. For example, Ethernet data may be transmitted in packets. The packets may contain multiple fields, which may include data, time stamps, source/destination addresses, and/or other identifying information.

In some embodiments, the network 100 implements bridging in which each of the network elements 102-110 functions as a bridge, such as an Ethernet bridge. The network elements 102-110 may all belong to the same bridging domain and/or to different bridging domains.

Additionally, the network 100 may implement xSTP to ensure a loop free topology. For instance, each of the network elements 102-110 may calculate a spanning tree of the network 100 including a selection of edges—e.g., transmission media 12—that form a tree spanning every node—e.g., network elements 102-110, or bridges,—in which every node lies in the spanning tree but no loops are formed. Those edges that are not part of the active spanning tree may be logically disabled, leaving a single active path between any two nodes. The disabled edges provide redundancy and may be automatically enabled in the event of a failure of an active edge.

At least one of the network elements 102-110 may include multiple individual switching units. In some embodiments, the switching units may be configured to implement xSTP within the network element 102-110 in a completely distributed manner in which none of the xSTP is centralized, referred to herein as "distributed xSTP." All external protocol semantics may be fully preserved for external interfacing with other network elements 102-110 in a bridging domain of the network 100 and the network element 102-110 in which distributed xSTP is implemented may appear as a single bridge to the other network elements 102-110 of the bridging domain. While some embodiments described herein include completely distributed xSTP processing, other embodiments include partially distributed xSTP processing in which only some, but not all, of the processing associated with implementing the xSTP is distributed.

Figure 2:
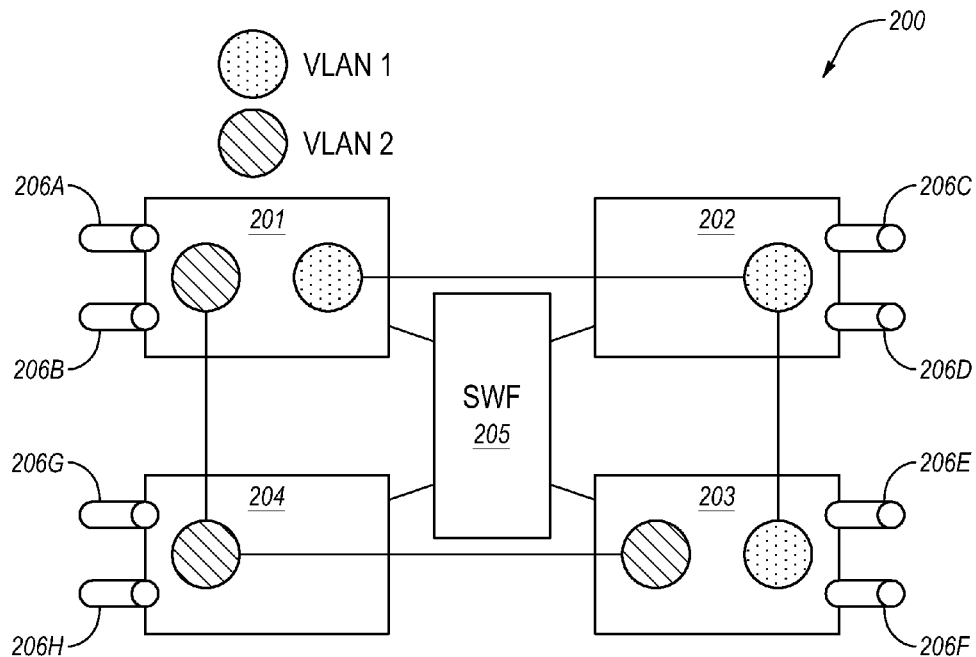
FIG. 2 is a block diagram of an example network element that may be implemented in the network of FIG. 1.

FIG. 2 is a block diagram of an example network element 200 that may be implemented in the network 100 of FIG. 1, arranged in accordance with at least some embodiments described herein. The network element 200 may correspond to any of the network elements 102-110 of FIG. 1, for example.

In the illustrated embodiment, the network element 200 includes multiple switching units 201-204 and a switching fabric (SWF) 205. Although not illustrated in FIG. 2, the network element 200 may be coupled to a communication network, such as the network 100 of FIG. 1.

With combined reference to FIGS. 1-2, each of the switching units 201-204 may be configured to independently implement xSTP processing in a completely distributed manner such that the network element 200 acts like a single bridge to other network elements 102-110 in the network 100 to which the network element 200 is coupled. For instance, implementing xSTP processing in a completely distributed manner may include each of the switching units 201-204 independently calculating an external spanning tree for the network element 200 in the network 100.

As used herein, the term "external" as applied to data traffic, ports, network elements, spanning trees, etc., refers to data traffic, ports, network elements, spanning trees, etc. that are communicated, are connected, exist, are applied, etc., respectively, external to a given network element, such as the network element 200 in the present example. In contrast, and as used herein, the term "internal" as applied to information, ports, spanning trees, etc. refers to information, ports, spanning trees, etc. that is communicated, are connected, exists, etc., respectively, internal to a given network element.

Returning to FIG. 2, each of the switching units 201-204 may include, for example, a line card, or other suitable switching unit. Additionally, each of the switching units 201-204 may include one or more external ports 206A-206H (hereinafter collectively "external ports 206"). Each of the external ports 206 may include, for instance, an electronic or optoelectronic transceiver module configured to communicatively couple the line card or other switching unit 201-204 to an Ethernet cable or optical fiber or other suitable transmission medium and through which data traffic may be transmitted to and/or received from an external network element.

Data traffic transmitted from any of the switching units 201-204 to an external network element may be referred to as "outbound data traffic," while data traffic received at any of the switching units 201-204 from an external network element may be referred to as "inbound data traffic." The switching unit 201-204 that receives the inbound data traffic from an external network element may be referred to as a receiving switching unit, while the switching unit 201-204 that sends the outbound data traffic to an external network element may be referred to as a sending switching unit. A given one of the external ports 206 on which inbound data traffic is received may be referred to as an ingress port, while a given one of the external ports 206 from which outbound data traffic is sent may be referred to as an egress port. The same data traffic may be inbound data traffic when it is received at the network element 200 and outbound data traffic when it is sent from the network element 200 to an external network element. A given switching unit 201-204 may be a receiving switching unit when receiving inbound data traffic and a sending switching unit when sending outbound data traffic.

Each of the switching units 201-204 may additionally include one or more internal ports (not labeled) configured to communicatively couple the respective switching unit 201-204 to the other switching units 201-204 in the network element 200 via the SWF 205. The SWF 205 may be configured to route inbound data traffic received from one external network element at a respective one of the switching units 201-204 to a different one of the switching units 201-204 in a single hop for transmission as outbound data traffic to another external network element. Routing the data traffic in a single hop may include routing the data traffic directly from the receiving switching unit 201-204 to the sending switching unit 201-204 via the SWF 205 without going through any intervening switching units 201-204.

The switch fabric (SWF) 205 may be configured to provide both a data plane and a control plane between the switching units 201-204. The data plane and the control plane may be implemented using the same physical resources, e.g., the SWF 205, different physical resources, or any combination thereof, while the data plane may include data traffic exchanged between the switching units 201-204 via the SWF 205, and the control plane may include control information exchanged between the switching units 201-204 via the SWF 205. The control plane may include, for example, an internal Ethernet network of the network element 200 configured to communicatively couple the switches 201-204 together.

In some embodiments, control information may be communicated between the switching units 201-204, e.g., via the control plane provided by the SWF 205, to facilitate completely distributed xSTP processing by the switching units 201-204 within the network element 200. The switching units 201-204 may independently implement xSTP processing insofar as the switching units 201-204 may independently perform any processing associated with carrying out xSTP, while the processing at a given one of the switching units 201-204 may nevertheless depend on or use control information exchanged between the switching units 201-204.

Alternately or additionally, the switching units 201-204 of the network element 200 may be configured to independently implement xSTP processing by, for a given one of the switching units, independently determining port states and port roles for the external ports 206 of the given switching unit 201-204 based on control information received from other switching units via the control plane of the network element.

FIG. 2 additionally illustrates that the network element 200 may include multiple virtual local area networks (VLANs), including VLAN 1 and VLAN 2. Each of the switching units 201-204 may belong to some or all of the VLANs implemented in the network element 200. For instance, in the illustrated embodiment, the switching unit 202 belongs only to the VLAN 1 and the switching unit 204 belongs only to the VLAN 2. In contrast, each of the switching units 201, 203 belongs to both the VLAN 1 and the VLAN 2.

Each of the VLANs of the network element 200 may be included in a different bridging domain. Alternately or additionally, each of the VLANs or bridging domains may be part of a different xSTP instance. Accordingly, in some xSTP implementations, such as MSTP, the switching units 201-204 may calculate a separate external and internal spanning tree for each of the bridging domains or VLANs to which the switching units 201-204 belong. For instance, the switching unit 202 may calculate a single external spanning tree for the bridging domain including VLAN 1 and a single internal spanning tree for the VLAN 1. The switching unit 204 may calculate a single external spanning tree for the bridging domain including VLAN 2 and a single internal spanning tree for the VLAN 2. Each of the switching units 201, 203 may calculate an external spanning tree for both the bridging domain including the VLAN 1 and the bridging domain including the VLAN 2, and an internal spanning tree for both the VLAN 1 and the VLAN 2. Additional details regarding external spanning trees and internal spanning trees according to some embodiments are provided below.

The network element 200 may be assigned a bridge ID, NE_BID, according to the xSTP protocol implemented by the network element 200. The bridge ID of the network element 200 may be visible to external network elements in a same bridging domain as the network element 200 and may be used by the switching units 201-204 and external network elements (or by switching units of the external network elements) according to the xSTP protocol. Generally, for example, the bridge IDs of the network element 200 and the external network elements in the bridging domain may be used to calculate a spanning tree for the bridging domain. In particular, the bridge IDs of the various network elements may be used to determine a root bridge of the bridging domain and in some cases port roles, such as root ports and/or designated ports, for the external ports of a given network element.

According to some embodiments, each of the switching units 201-204 may be assigned an internal bridge ID. The internal bridge IDs of the switching units 201-204 may be used in calculating the internal spanning tree(s) for the switching units 201-204, including to determine one of the switching units 201-204 as a root bridge for the internal spanning tree, and/or to determine port roles for internal ports of the switching units 201-204 in the internal spanning tree(s).

The internal bridge IDs may be assigned in some embodiments by, for each switching unit 201-204, adding a different number to the bridge ID of the network element 200 such that the internal bridge IDs of the switching units 201-204 are in a range from NE_BID+1 to NE_BID+N, where N is the number of switching units 201-204. By way of example, a slot number corresponding to a slot of the network element 200 in which a given one of the switching units 201-204 has been inserted may be added to the bridge ID, NE_BID, of the network element 200 to determine a corresponding internal bridge ID for the given one of the switching units 201-204. In some embodiments, only the bridge ID of the network element 200 may be visible outside the network element 200, while the internal bridge IDs of the switching units 201-204 may be visible only to the other switching units 201-204 in the same bridging domain.

Figure 3:
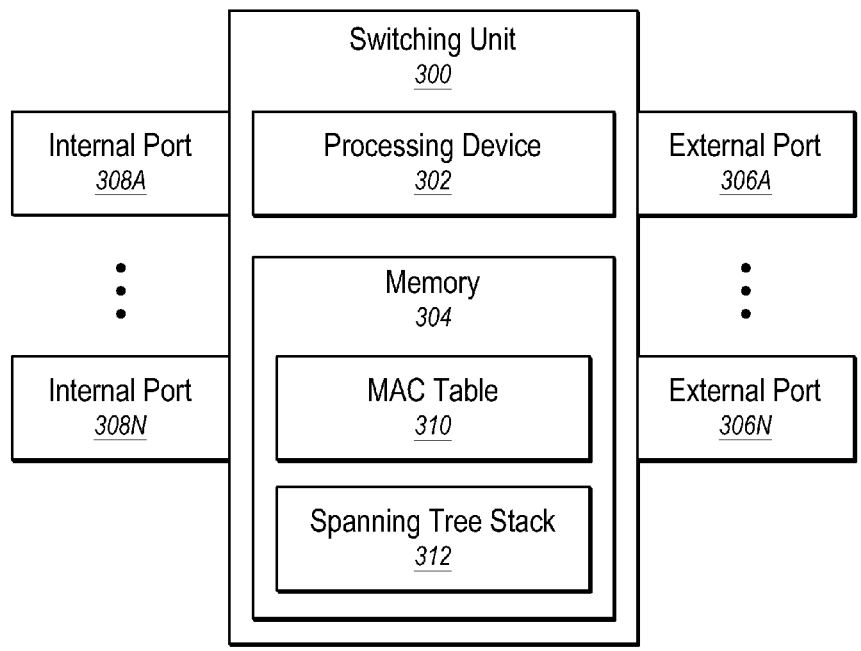
FIG. 3 is a block diagram of an example switching unit that may be implemented in the network element of FIG. 2.

FIG. 3 is a block diagram of an example switching unit 300 that may be implemented in the network element 200 of FIG. 2, arranged in accordance with at least some embodiments described herein. Alternately or additionally, the switching unit 300 may be implemented in any of the network elements 102-110 of FIG. 1. The switching unit 300 may correspond to any of the switching units 201-204 of FIG. 2, for example.

As illustrated in FIG. 3, the switching unit 300 may include a processing device 302, a memory 304, one or more external ports 306A-306N (hereinafter collectively "external ports 306") and one or more internal ports 308A-308N (hereinafter collectively "internal ports 308"). Other configurations are also possible and the configuration of the switching unit 300 of FIG. 3 is provided by way of example only.

In general, the processing device 302 may be configured to execute computer-readable instructions stored in a computer-readable storage medium, such as the memory 304, to perform operations described herein, such as implementing distributed xSTP processing. The processing device 302 may include a network processing unit (NPU), a central processing unit (CPU), a processor, a microprocessor, a controller, a microcontroller, or other suitable processing device.

The memory 304 may be configured to store thereon software or program code in the form of computer-readable instructions that may be executed by the processing device 302 to perform the operations described herein. The memory 304 may also be configured to store thereon data used in implementing distributed xSTP processing, such as a media access control (MAC) table 310 and/or a spanning tree stack 312.

Entries in the MAC table 310 may be created for various destinations, e.g., external network elements, where each entry corresponds to a path to a given destination, based on the active links that exist through the network. When the switching unit 300 receives a packet, it may forward the packet to a destination coupled to the active links, based on the information in the entries of the MAC table 310 about where the destination is located. If one of the active links goes down, a new path may be calculated for the various addresses based on the existing active links.

The spanning tree stack 312 may calculate an external spanning tree of a bridging domain to which the switching unit 300 belongs. The switching unit 300 may calculate the external spanning tree using xSTP based on, for example, Hello bridge protocol data units (BPDUs) received on its external ports 306 from any external network elements, or according to Hello BPDUs forwarded from other switching units and received on its internal ports 308 via a control plane of an SWF in a same network element in which the switching unit 300 is installed, or according to other control information exchanged with the other switching units via the control plane of the SWF. If the switching unit 300 belongs to multiple bridging domains, the memory 304 may include multiple spanning tree stacks 312, each corresponding to a different one of the bridging domains.

The spanning tree stack 312 may additionally calculate an internal spanning tree for the switching unit 300 and any other switching units installed in the same network element and belonging to the same bridging domain, which in some cases may include a VLAN on a corresponding network element, as the switching unit 300. The internal spanning tree may be calculated by the processing device 302 in generally the same manner as the external spanning tree. The internal spanning tree may be implemented to ensure a loop free topology for the exchange of control information among the switching units installed in the same network element and belonging to the same VLAN as the switching unit 300. If the switching unit 300 belongs to multiple VLANs, the memory 304 may include multiple spanning tree stacks 312, each corresponding to a different one of the VLANs.

Figure 4A:
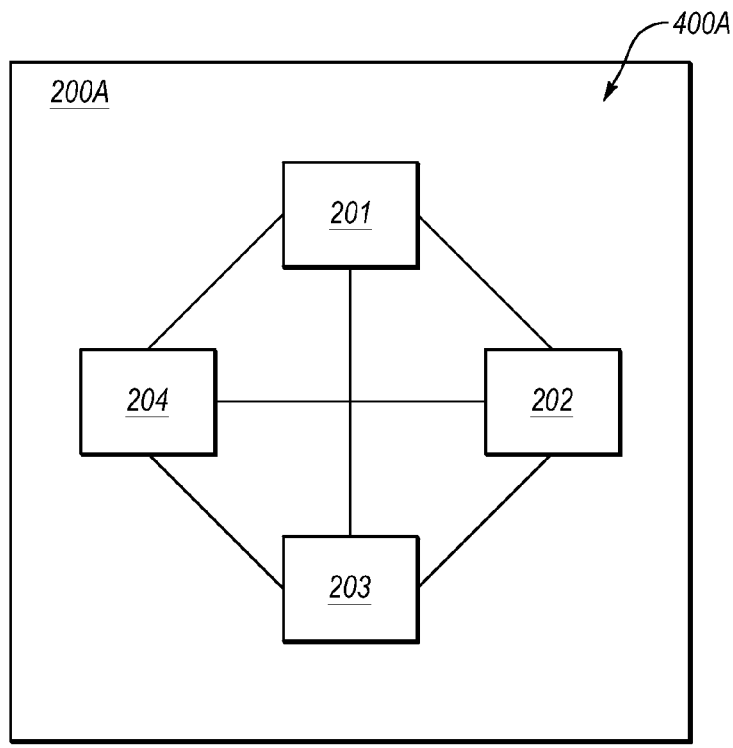
FIGS. 4A-4B illustrate two different example control plane configurations that may be implemented in embodiments of the network element of FIG. 2.
Figure 4B:
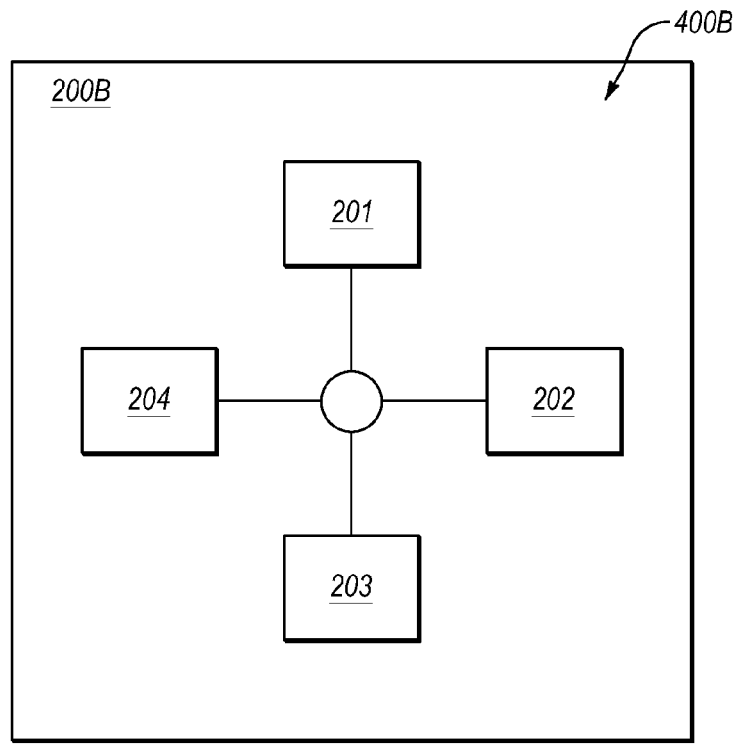

FIGS. 4A-4B illustrate two different example control plane configurations 400A, 400B that may be implemented in embodiments of the network element 200 of FIG. 2, arranged in accordance with at least some embodiments described herein. In particular, FIG. 4A illustrates a network element 200A including the control plane configuration 400A and FIG. 4B illustrates a network element 200B including the control plane configuration 400B.

In the network element 200A of FIG. 4A, the control plane configuration 400A includes a mesh configuration. In the network element 200B of FIG. 4B, the control plane configuration 400B includes a star configuration. More generally, the control plane configuration of a network element according to embodiments described herein may include virtually any physical configuration, including mesh, star, ring, or other physical configuration.

Accordingly, within each of the network elements 200A, 200B of FIGS. 4A-4B, xSTP may be implemented internally, including each switching unit 201-204 independently calculating an internal spanning tree for each VLAN of the network element 200 to which the respective switching unit 201-204 belongs, to ensure a loop free topology for the exchange of control information, such as BPDUs, between the switching units 201-204.

In some embodiments, the flow of control information in the control plane is controlled separately from the flow of data traffic in the data plane. As such, data traffic may not be affected by the internal implementation of xSTP among the switching units 201-204 for the control plane. In particular, data traffic may be switched from an ingress port of one of the switching units 201-204 to an egress port of one of the switching units 201-204 in a single hop and in any manner now known or later developed, notwithstanding the existence of an internal spanning tree for exchanging control information among the switching units 201-204.

Figure 5A:
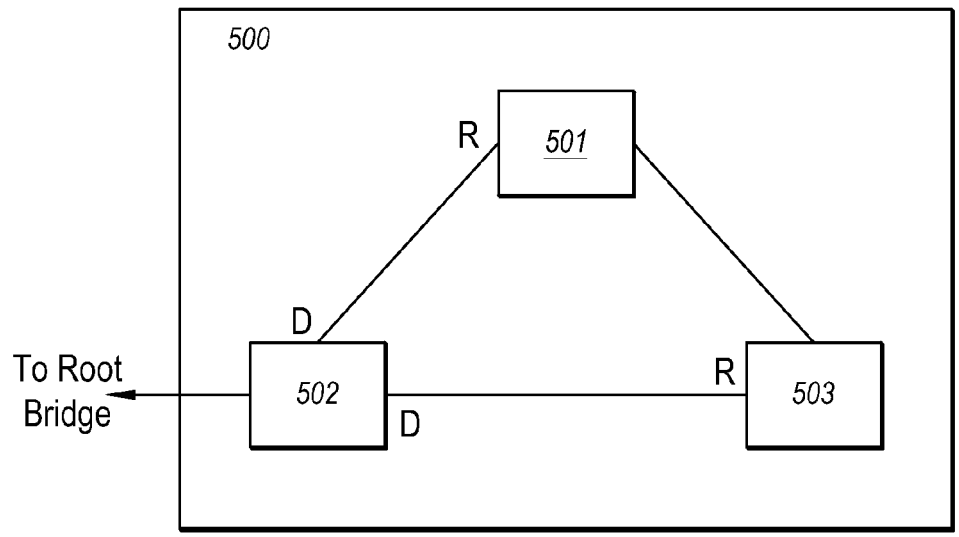
FIGS. 5A-5B illustrate aspects of internal xSTP that may be implemented in a network element.
Figure 5B:
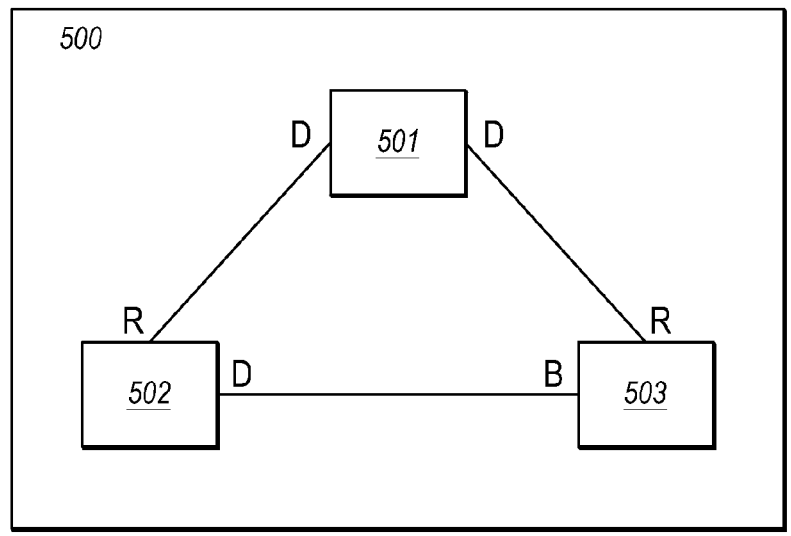

FIGS. 5A-5B illustrate aspects of internal xSTP that may be implemented in a network element 500, arranged in accordance with at least some embodiments described herein. The network element 500 may correspond to the network elements 102-110 and 200 of FIGS. 1-2, for example.

In more detail, FIGS. 5A and 5B conceptually illustrate the determination of internal port roles for an internal spanning tree including switching units 501-503 when the network element 500 is, respectively, a non-root bridge and a root bridge in a bridging domain having a corresponding external spanning tree.

In FIG. 5A, when the network element 500 is a non-root bridge in the external spanning tree, the internal port roles may be determined by the switching unit 501-503 that has the root port in the external spanning tree. In the example of FIG. 5A, the switching unit 502 has the root port for the external spanning tree and may be designated as the root bridge for the internal spanning tree. The switching units 501-503 may then apply internal xSTP to determine internal port roles based on the switching unit 502 having the root port for the external spanning tree being designated as the internal root bridge. Specifically, active internal ports of the switching units 501-503 that lead away from the internal root bridge, or away from the switching unit 502 in this example, to other switching units may be assigned as designated ports (denoted as "D" in FIG. 5A) in the internal spanning tree. Additionally, active internal ports of the switching units 501-503 that lead to the internal root bridge may be assigned as root ports (denoted as "R" in FIG. 5A) in the internal spanning tree.

In FIG. 5B, when the network element 500 is a root bridge in the external spanning tree, the internal port roles may be determined based on internal bridge IDs of the switching units 501-503. For example, each of the switching units 501-503 may be assigned an internal bridge ID as described previously with respect to FIG. 2. In the example of FIG. 5B, the switching unit 501 may have a lowest internal bridge ID among all other switching units 502-503 that belong to the same bridging domain and are included in the network element 500. The switching units 501-503 may exchange internal BPDUs including internal bridge IDs which may be compared according to the standard xSTP BPDU comparison algorithm to identify one of the switching units 501-503 as a root bridge for the internal spanning tree and to assign internal port roles. Whereas the switching unit 501 may have the lowest internal bridge ID, the switching unit 501 may be assigned as the root bridge for the internal spanning tree. Active internal ports of the switching units 501-503 that lead away from the internal root bridge, or away from the switching unit 501 in this example, to other switching units may be assigned as designated ports (denoted as "D" in FIG. 5B) in the internal spanning tree. Additionally, active internal ports of the switching units 501-503 that lead to the internal root bridge may be assigned as root ports (denoted as "R" in FIG. 5B) in the internal spanning tree. Internal ports of the switching units 501-503 that are blocked according to the internal spanning tree are denoted as "B" in FIG. 5B.

Figure 6:
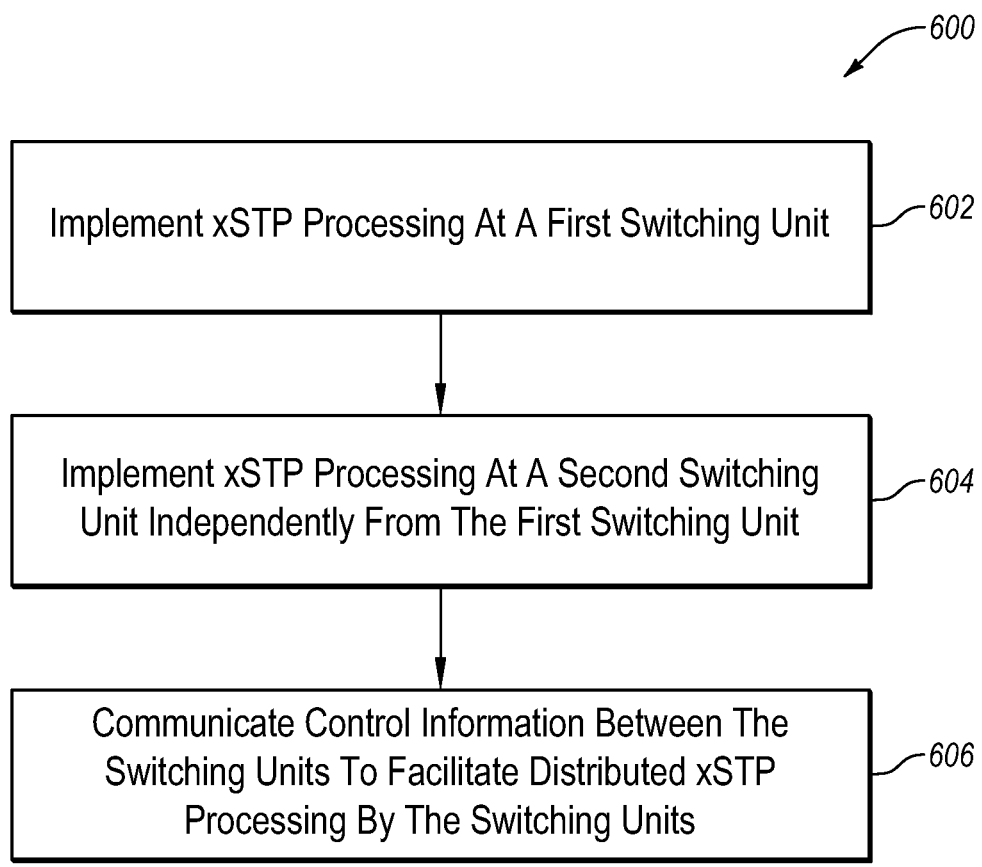
FIG. 6 is a flowchart of an example method of controlling network traffic at a network element including multiple switching units.

FIG. 6 is a flowchart of an example method 600 of controlling network traffic at a network element including multiple switching units, arranged in accordance with at least some embodiments described herein. In some embodiments, some or all of the method 600 may be performed by a network element, such as any of the network elements 102-110, 200, 200A, 200B, 500 of FIGS. 1-2 and 4A-5B. More particularly, some or all of the method 600 may be performed by multiple switching units included in such a network element. The multiple switching units of the network element may include a first switching unit and a second switching unit.

The method 600 may begin at block 602 in which xSTP processing is implemented at the first switching unit. Implementing xSTP processing at the first switching unit may include the first switching unit calculating a first external spanning tree of a bridging domain that includes the network element.

The method 600 may continue at block 604 in which xSTP processing is implemented at the second switching unit independently from the first switching unit. Independently implementing xSTP processing at the second switching unit may include the second switching unit independently calculating a second external spanning tree of the bridging domain.

The method 600 may continue at block 606 in which control information is communicated between the switching units of the network element to facilitate distributed xSTP processing. The distributed xSTP processing may be implemented by the switching units in such a way that the network element appears as a single bridge to other network elements in the bridging domain.

In some embodiments, the switching units of the network element may be configured to independently implement xSTP processing by, for a given switching unit, independently determining port states and port roles for external ports of the given switching unit based on control information received from other switching units via a control plane of the network element.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, although not illustrated in FIG. 6, the method 600 may additionally include, at the first switching unit, calculating a first internal spanning tree for the first switching unit within the network element. At the second switching unit, a second internal spanning tree for the second switching unit within the network element may be calculated. The first and second internal spanning trees calculated by the first and second switching units may cover all switching units in the network element that belong to the bridging domain of the network element, or to an internal VLAN of the network element. As described with respect to FIGS. 5A-5B, the calculation of each of the first and second internal spanning trees may be based on at least one of which of the switching units of the network element has an external port that is a root port for the network element in the bridging domain, and an internal bridge ID assigned to each of the switching units.

Additional details regarding aspects of independently implementing xSTP processing in multiple switching units in the network element in the method 600 of FIG. 6 are provided with respect to FIGS. 7-10.

Figure 7:
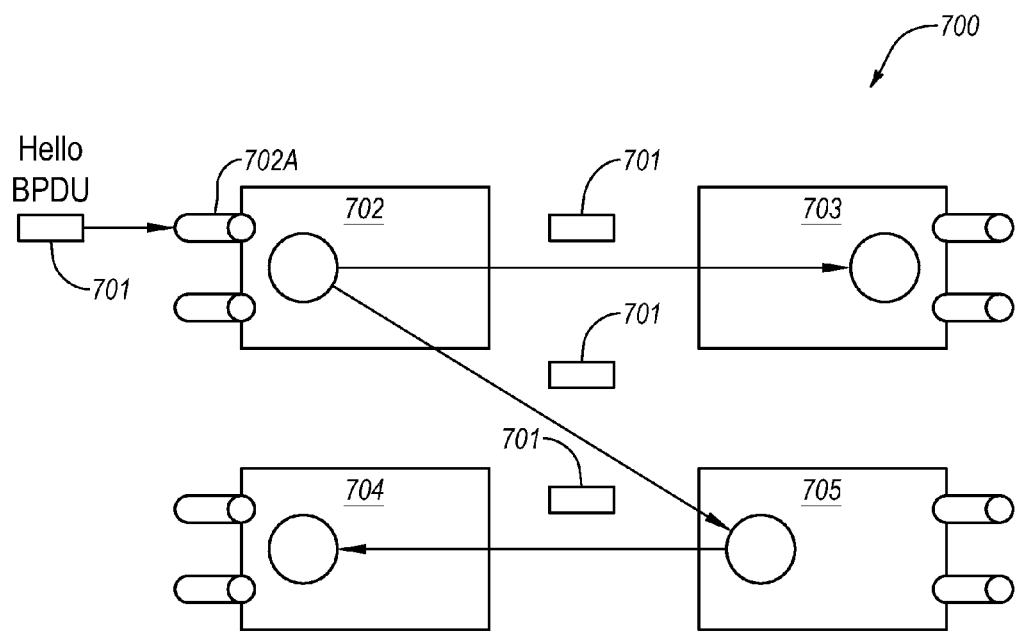
FIG. 7 illustrates distributed xSTP processing including Hello BPDU processing that may be implemented in a network element.

FIG. 7 illustrates distributed xSTP processing including Hello BPDU processing that may be implemented in a network element 700, arranged in accordance with at least some embodiments described herein. The network element 700 may correspond to any of the network elements 102-110, 200, 200A, 200B, 500 described above.

In the example of FIG. 7, a Hello BPDU 701 is received by a switching unit 702 on one of its external ports 702A from one of the other network elements in a bridging domain of the network element 700. The switching unit 702 may forward the Hello BPDU 701 to other switching units 703-705 of the network element 700 according to a corresponding internal spanning tree. Each of the switching units 702-705 may independently implement xSTP processing by independently processing the Hello BPDU 701 according to the xSTP protocol and taking any appropriate actions, based on the Hello BPDU 701, for external ports of the corresponding switching unit 702-705.

In some embodiments, each of the switching units 702-705 may periodically generate and send internal Hello BPDUs to other switching units 702-705 in the network element 700. More particularly, each of the switching units 702-705 may periodically generate and send internal Hello BPDUs to other switching units 702-705 attached to any designated ports, D, of the respective switching unit 702-705.

Alternately or additionally, each of the switching units 702-705 may periodically generate and send, via an external port of the switching unit 702-705, external Hello BPDUs to an external network element attached to the external port of the respective switching unit 702-705. More particularly, each of the switching units 702-705 may periodically generate and send external Hello BPDUs to any network elements connected to designated external ports, D, of the respective switching unit 702-705.

Figure 8A:
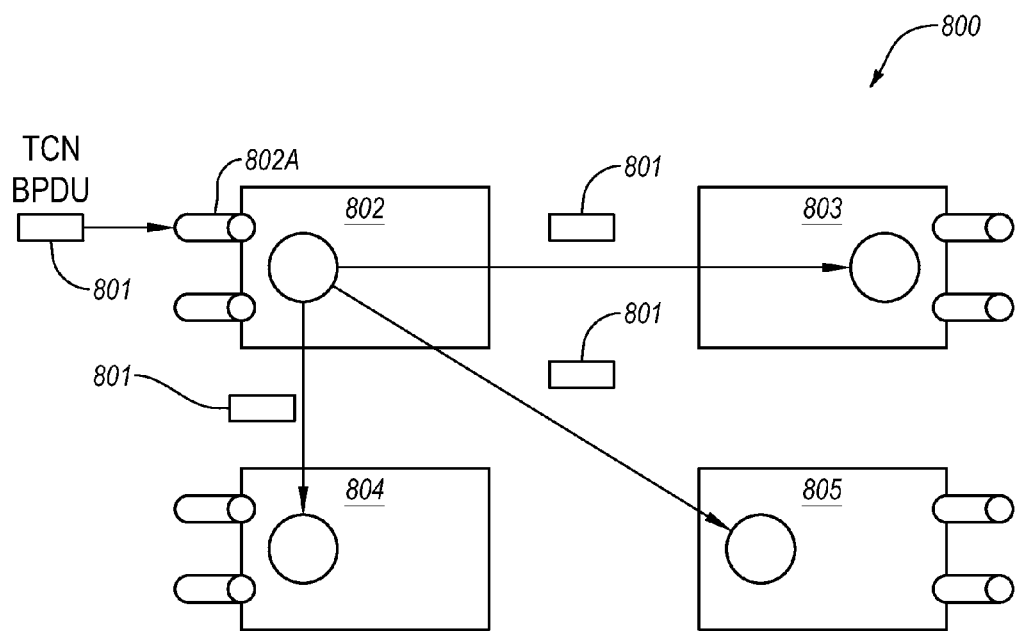
FIGS. 8A-8B illustrate distributed xSTP processing including topology change notification (TCN) BPDU processing that may be implemented in a network element.
Figure 8B:
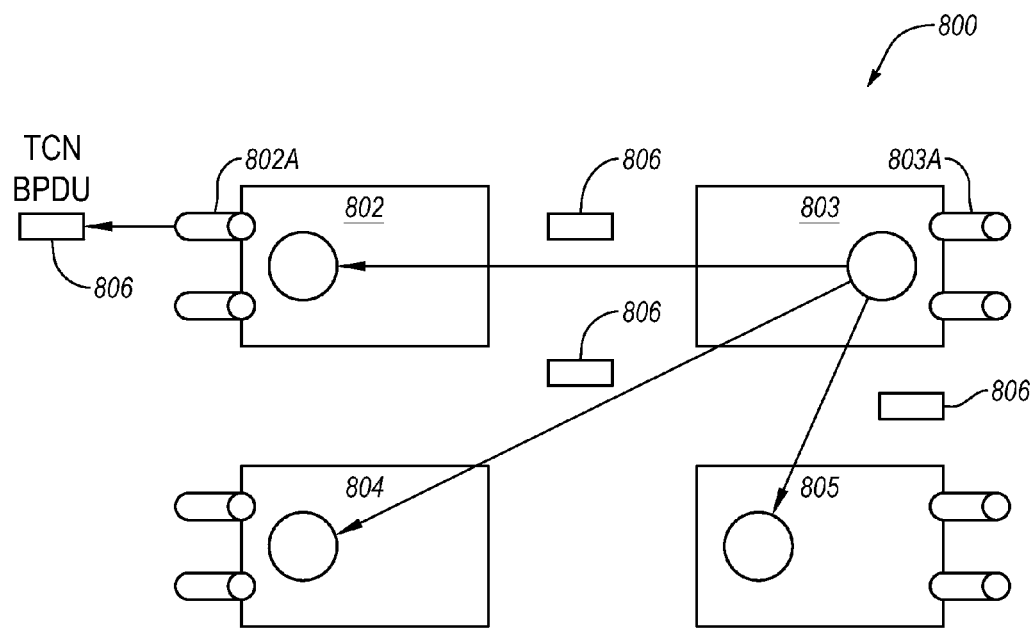

FIGS. 8A-8B illustrate distributed xSTP processing including topology change notification (TCN) BPDU processing that may be implemented in a network element 800, arranged in accordance with at least some embodiments described herein. In more detail, FIG. 8A illustrates processing of an external TCN BPDU and FIG. 8B illustrates processing of an internal TCN BPDU. The network element 800 of FIGS. 8A-8B may correspond to any of the network elements 102-110, 200, 200A, 200B, 500, 700 described above.

FIG. 8A illustrates processing of an external TCN BPDU 801. In the example of FIG. 8A, the external TCN BPDU 801 is received by a switching unit 802 on one of its external ports 802A from one of the other network elements in a bridging domain of the network element 800. The switching unit 802 may be one of multiple switching units 802-805 of the network element 800.

In some embodiments, the switching units 802-805 independently implementing xSTP processing may include the switching unit 802 processing the external TCN BPDU 801 by receiving the external TCN BPDU 801 on the external port 802A, forwarding the external TCN BPDU 801 to other switching units 803-805 of the network element 800 via a corresponding control plane according to a corresponding internal spanning tree for processing by the other switching units 803-805, and flushing entries from a local MAC table of the switching unit 802 for all ports except the external port 802A.

Alternately or additionally, the switching units 802-805 independently implementing xSTP processing may include each of the switching units 803-805 processing the external TCN BPDU 801 by receiving the external TCN BPDU 801 forwarded to the respective switching unit 803-805 by the switching unit 802 via the control plane, and flushing entries from a local MAC table of the respective switching unit 803-805 for all ports except the external port 802A of the switching unit 802. In some embodiments, the TCN BPDU 801 forwarded to the switching units 803-805 may be modified by the switching unit 802 prior to forwarding so that the forwarded TCN BPDU 801 identifies the external port 802A on which the TCN BPDU 801 is originally received at the network element 800.

FIG. 8B illustrates processing of an internal TCN BPDU 806. In the example of FIG. 8B, the internal TCN BPDU 806 may be generated by the switching unit 803 in response to activation of one of its external ports 803A.

In some embodiments, the switching units 802-805 independently implementing xSTP processing may include the switching unit 803 processing the internal TCN BPDU 806 by, in response to activation of the external port 803A, generating the internal TCN BPDU 806, forwarding the internal TCN BPDU 806 to other switching units 802, 804, 805 of the network element 800 via a corresponding control plane according to a corresponding internal spanning tree for processing by the other switching units 802, 804, 805, and flushing entries from a local MAC table of the switching unit 803 for all ports.

Alternately or additionally, the switching units 802-805 independently implementing xSTP processing may include the switching units 802, 804, 805 processing the internal TCN BPDU 806 generated at the switching unit 803 by receiving the internal TCN BPDU 806 forwarded to the respective switching unit 802, 804, 805 by the switching unit 803 via the control plane, and flushing entries from a local MAC table of the respective switching unit 802, 804, 805 for all ports.

Figure 9A:
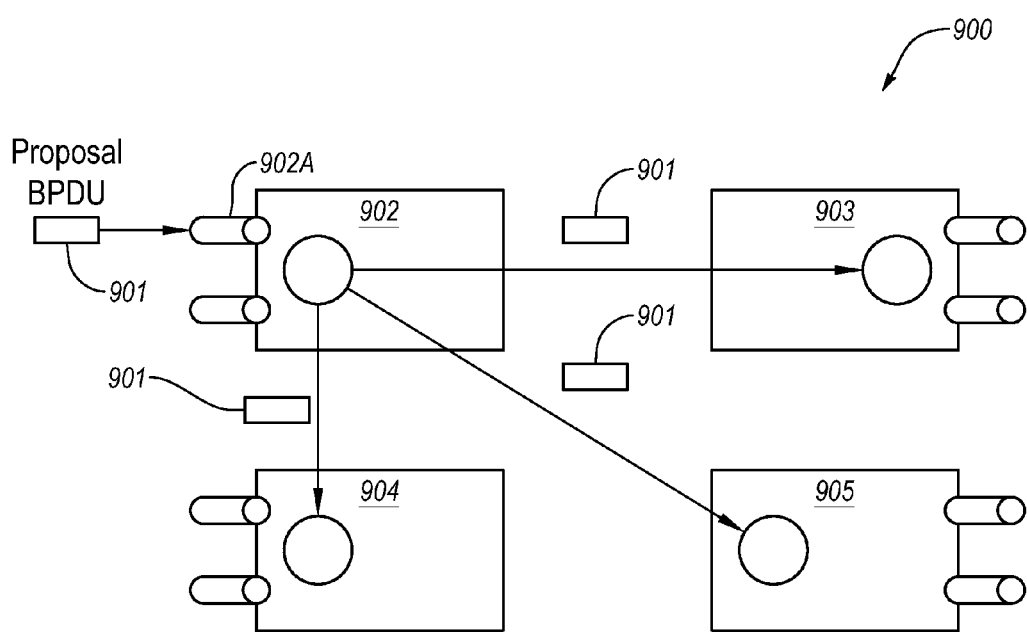
FIGS. 9A-9B illustrate distributed xSTP processing including Proposal BPDU processing that may be implemented in a network element.
Figure 9B:
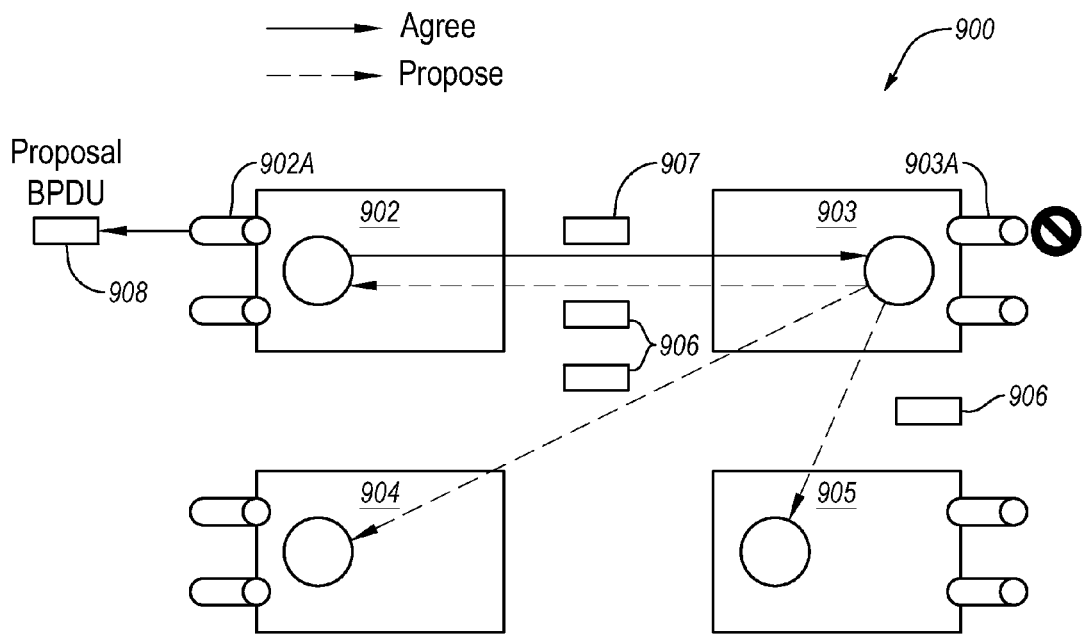

FIGS. 9A-9B illustrate distributed xSTP processing including Proposal BPDU processing that may be implemented in a network element 900, arranged in accordance with at least some embodiments described herein. In more detail, FIG. 9A illustrates processing of an external Proposal BPDU and FIG. 9B illustrates processing of an internal Proposal BPDU. The network element 900 may correspond to any of the network elements 102-110, 200, 200A, 200B, 500, 700, 800 described above.

FIG. 9A illustrates processing of an external Proposal BPDU 901. In the example of FIG. 9A, the external Proposal BPDU is received by a switching unit 902 on one of its external ports 902A from one of the other network elements in a bridging domain of the network element 900. The switching unit 902 may be one of multiple switching units 902-905 of the network element 900.

In some embodiments, the switching units 802-805 independently implementing xSTP processing may include the switching unit 902 receiving the external Proposal BPDU on the external port 902A and determining whether the switching unit 902 agrees with the external Proposal BPDU. If the switching unit 902 agrees with the external Proposal BPDU, the switching unit 902 may perform a local sync on all external ports of the switching unit 902, may send an Agreement BPDU to the external network element from which the external Proposal BPDU is received, and may forward the external Proposal BPDU to other switching units via a control plane of the network element 900 for processing by the other switching units 903-905. If the switching unit 902 disagrees with the external Proposal BPDU 901, the switching unit 902 may generate and send a Counterproposal BPDU to the external network element without forwarding the external Proposal BPDU 901 to any of the switching units 903-905.

Alternately or additionally, the switching units 902-905 independently implementing xSTP processing may include the switching units 903-905 receiving the external Proposal BPDU 901 forwarded to the respective switching unit 903-905 by the switching unit 902 via the control plane if the switching unit 902 agrees with the external Proposal BPDU 901, or remaining unaware of the external Proposal BPDU 901 if the switching unit 902 disagrees with the external Proposal BPDU 901.

FIG. 9B illustrates processing of an internal Proposal BPDU 906. In the example of FIG. 9B, the internal Proposal BPDU 906 may be generated by the switching unit 903 in response to system startup or loss of root connectivity, such as may occur with failure of one of the external ports 903A of the switching unit 903 in an example embodiment. Alternately or additionally, multiple ones of the switching units 902-905 may generate a corresponding internal Proposal BPDU in response to system startup or loss of root connectivity, although only one such internal Proposal BPDU 906 is illustrated in FIG. 9B for simplicity.

In some embodiments, the switching units 902-905 independently implementing xSTP processing may include the switching unit 902 generating the internal Proposal BPDU 906, sending the internal Proposal BPDU 906 to the other switching units 903-905 in the network element 900 via the control plane, and resolving any disagreements with the other switching units 903-905 in the network element if any of the other switching units 903-905 also generate and send an internal Proposal BPDU (not shown). After resolving any such disagreements, the one of the switching units 902-905 that generated the agreed-upon internal Proposal BPDU, or the switching unit 903 in this example, may receive from each of the other switching units 902, 904, 905 an Agreement BPDU 907 (only one Agreement BPDU 907 is illustrated in FIG. 9B). Each of the switching units 902-905 may then generate and send an external Proposal BPDU 908 (only one external Proposal BPDU 908 is illustrated in FIG. 9B) collectively agreed upon by the switching units 902-905 on one or more respective external ports of the respective switching unit 902-905 to an external network element communicatively coupled to the respective switching unit 902-905 via the corresponding external port of the respective switching unit 902-905.

Figure 10:
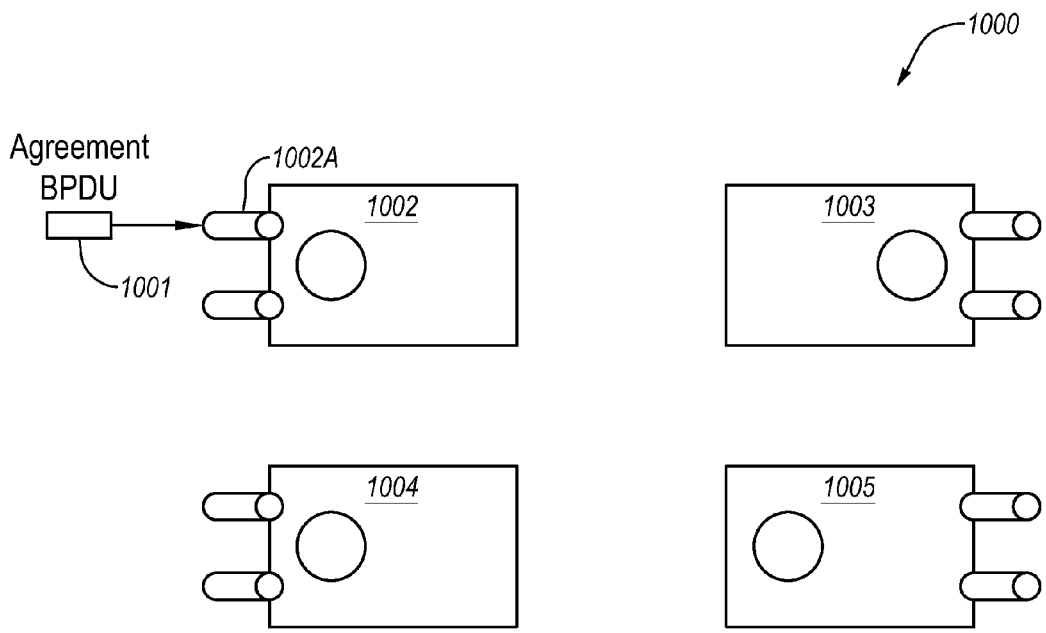
FIG. 10 illustrates distributed xSTP processing including Agreement BPDU processing that may be implemented in a network element, all arranged in accordance with at least some embodiments described herein.

FIG. 10 illustrates distributed xSTP processing including Agreement BPDU processing that may be implemented in a network element 1000, arranged in accordance with at least some embodiments described herein. The network element 1000 may correspond to any of the network elements 102-110, 200, 200A, 200B, 500, 700, 800, 900 described above.

In the example of FIG. 10, an Agreement BPDU 1001 is received by a switching unit 1002 on one of its external ports 1002A from one of the other network elements in a bridging domain of the network element 1000. The other network element may have generated and sent the Agreement BPDU 1001 in response to receiving and agreeing with an external Proposal BPDU sent by the switching unit 1002 to the other network element. The switching unit 1002 may be one of multiple switching units 1002-1005 of the network element 1000

In some embodiments, the switching units 1002-1005 independently implementing xSTP processing may include the switching unit 1002 receiving the Agreement BPDU 1001 on its external port 1002A without forwarding the Agreement BPDU 1001 to other switching units 1003-1005. Because the switching units 1002-1005 may have collectively agreed on generating and sending the external Proposal BPDU that caused the external network element to generate the Agreement BPDU 1001 to begin with, it may not serve any purpose to forward the Agreement BPDU 1001 to the other switching units 1003-1005 such that forwarding the Agreement BPDU 1001 to the other switching units 1003-1005 may be omitted.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A network element coupled to a communication network, the network element comprising:
   a plurality of switching units configured to independently implement a Spanning Tree Protocol (xSTP) processing in a distributed manner including each of the plurality of switching units of the network element independently calculating an external spanning tree for the network element in the communication network, the network element acting as a single bridge to other network elements in a bridging domain of the communication network; and
   a control plane configured to communicatively couple together the plurality of switching units,
   wherein the plurality of switching units are further configured to independently implement xSTP processing by, for a given switching unit:
      receiving an external Hello bridge protocol data unit (BPDU) from an external network element and forwarding the external Hello BPDU to other switching units via the control plane;
      periodically generating and sending internal Hello BPDUs to other switching units in the network element via the control plane; and
      periodically generating and sending, via a first external port of the given switching unit, external Hello BPDUs to an external network element attached to the first external port of the given switching unit.

2. The network element of claim 1, wherein the control plane comprises an Ethernet network.

3. The network element of claim 1, wherein the plurality of switching units are further configured to independently implement xSTP processing by, for a given switching unit, independently determining port states and port roles for external ports of the given switching unit based on control information received from other switching units via the control plane.

4. The network element of claim 1, wherein the plurality of switching units are further configured to independently implement xSTP processing by, for a given switching unit, performing at least one of:
   processing an external topology change notification (TCN) BPDU received on a second external port of the given switching unit by:
      receiving the external TCN BPDU on the second external port from an external network element;
      forwarding the external TCN BPDU to other switching units via the control plane for processing by the other switching units; and
      flushing entries from a local media access control (MAC) table of the given switching unit for all ports except the second external port of the given switching unit on which the external TCN BPDU was received; and
   processing an external TCN BPDU received on an external port of a different switching unit by:
      receiving the external TCN BPDU forwarded to the given switching unit by the different switching unit via the control plane; and
      flushing entries from a local media access control (MAC) table of the given switching unit for all ports except the second external port of the different switching unit on which the external TCN BPDU was received.

5. The network element of claim 1, wherein the plurality of switching units are further configured to independently implement xSTP processing by, for a given switching unit, performing at least one of:
   processing an internal topology change notification (TCN) BPDU generated by the given switching unit by:
      in response to activation of a second external port of the given switching unit, generating the internal TCN BPDU;
      forwarding the internal TCN BPDU to other switching units via the control plane for processing by the other switching units; and
      flushing entries from a local media access control (MAC) table of the given switching unit for all ports; and
   processing an internal TCN BPDU generated by a different switching unit by:
      receiving the internal TCN BPDU forwarded to the given switching unit by the different switching unit via the control plane; and
      flushing entries from a local media access control (MAC) table of the given switching unit for all ports.

6. The network element of claim 1, wherein the plurality of switching units are further configured to independently implement xSTP processing by, for a given switching unit:
   receiving an external Proposal (BPDU) BPDU on a second external port of the given switching unit from an external network element; and
   determining whether the given switching unit agrees with the external Proposal BPDU; and
   if the given switching unit agrees with the external Proposal BPDU:

performing a local sync on all external ports of the given switching unit;
sending an Agreement BPDU to the external network element from which the external Proposal BPDU was received; and
forwarding the external Proposal BPDU to other switching units via the control plane for processing by the other switching units; or
if the given switching unit disagrees with the external Proposal BPDU, generating and sending a Counterproposal BPDU to the external network element.

7. The network element of claim 1, wherein the plurality of switching units are further configured to independently implement xSTP processing by, for a given switching unit, and in response to system startup or loss of root connectivity:
generating an internal Proposal BPDU;
sending the internal Proposal BPDU to other switching units in the network element via the control plane;
resolving any disagreements with the other switching units in the network element; and
sending an external Proposal BPDU collectively agreed upon by the plurality of switching units on a second external port of the given switching unit to an external network element communicatively coupled to the given switching unit via the second external port of the given switching unit.

8. The network element of claim 1, wherein the plurality of switching units are further configured to independently implement xSTP processing by, for a given switching unit, receiving an Agreement BPDU on a second external port of the given switching unit from an external network element without forwarding the Agreement BPDU to other switching units.

9. The network element of claim 1, wherein the plurality of switching units comprise a first plurality of switching units collectively forming a first virtual local area network (VLAN) included in a first bridging domain corresponding to a first xSTP instance, the network element further comprising a second plurality of switching units collectively forming a second VLAN included in a second bridging domain in which the second plurality of switching units are configured to independently implement xSTP processing for a second xSTP instance in a completely distributed manner.

10. The network element of claim 1, wherein the network element comprises a packet optical networking platform and each of the plurality of switching units comprises a line card.

11. A method of controlling network traffic at a network element comprising a plurality of switching units, the method comprising:
at a first switching unit included in the plurality of switching units, implementing a Spanning Tree Protocol (xSTP) processing, including the first switching unit calculating a first external spanning tree of a bridging domain that includes the network element;
at a second switching unit included in the plurality of switching units, implementing xSTP processing independently from the first switching unit, including the second switching unit independently calculating a second external spanning tree of the bridging domain; and
communicating control information between the plurality of switching units to facilitate distributed xSTP processing by the plurality of switching units, the network element appearing as a single bridge to other network elements in the bridging domain.

12. The method of claim 11, wherein:
the first switching unit implementing xSTP processing further includes the first switching unit:
receiving an external Hello bridge protocol data unit (BPDU) from one of the other network elements;
forwarding the external Hello BPDU to other switching units; and
processing the Hello BPDU according to the xSTP protocol; and
the second switching unit implementing xSTP processing independently from the first switching unit further includes the second switching unit:
receiving the external Hello BPDU from the first switching unit; and
processing the Hello BPDU according to the xSTP protocol.

13. The method of claim 11, wherein:
the first switching unit implementing xSTP processing further includes the first switching unit processing an external topology change notification (TCN) bridge protocol data unit (BPDU) received on an external port of the given switching unit by:
receiving the external TCN BPDU on the external port from one of the other network elements;
forwarding the external TCN BPDU to other switching units via a control plane for processing by the other switching units; and
flushing entries from a local media access control (MAC) table of the first switching unit for all ports except the external port; and
the second switching unit implementing xSTP processing independently from the first switching unit further includes the second switching unit processing the external TCN BPDU received on the external port of the first switching unit by:
receiving the external TCN BPDU forwarded to the second switching unit by the first switching unit via the control plane; and
flushing entries from a local media access control (MAC) table of the second switching unit for all ports except the external port of the first switching unit.

14. The method of claim 11, wherein:
the first switching unit implementing xSTP processing further includes the first switching unit processing an internal topology change notification (TCN) bridge protocol data unit (BPDU) by:
in response to activation of an external port of the first switching unit, generating the internal TCN BPDU;
forwarding the internal TCN BPDU to other switching units via a control plane for processing by the other switching units; and
flushing entries from a local media access control (MAC) table of the first switching unit for all ports; and
the second switching unit implementing xSTP processing independently from the first switching unit further includes the second switching unit processing the internal TCN BPDU generated at the first switching unit by:
receiving the internal TCN BPDU forwarded to the second switching unit by the first switching unit via the control plane; and
flushing entries from a local media access control (MAC) table of the second switching unit for all ports.

15. The method of claim 11, wherein:
the first switching unit implementing xSTP processing further includes the first switching unit:
receiving an external Proposal bridge protocol data unit (BPDU) on an external port of the first switching unit from one of the other network elements;

determining whether the first switching unit agrees with the external Proposal BPDU; and if the first switching unit agrees with the external Proposal BPDU:

performing a local sync on all external ports of the first switching unit;

sending an Agreement BPDU to the one of the other network elements from which the external Proposal BPDU was received; and forwarding the external Proposal BPDU to other switching units via a control plane for processing by the other switching units; or if the given switching unit disagrees with the external Proposal BPDU, generating and sending a Counterproposal BPDU to the one of the other network elements; and the second switching unit implementing xSTP processing independently from the first switching unit further includes the second switching unit:

receiving the external Proposal BPDU forwarded to the second switching unit by the first switching unit via the control plane if the first switching unit agrees with the external Proposal BPDU; or remaining unaware of the external Proposal BPDU if the first switching unit disagrees with the external Proposal BPDU.

16. The method of claim 11, further comprising:

at the first switching unit, calculating a first internal spanning tree for the first switching unit within the network element; and at the second switching unit, calculating a second internal spanning tree for the second switching unit within the network element.

17. The method of claim 16, wherein the calculation of each of the first and second internal spanning trees is based on at least one of:

which of the plurality of switching units has an external port comprising a root port for the network element; and an internal bridge identifier (ID) assigned to each of the plurality of switching units.

18. The method of claim 11, wherein the xSTP includes standard Spanning Tree Protocol (STP), Rapid Spanning Tree Protocol (RSTP) or Multiple Spanning Tree Protocol (MSTP).

19. A network element coupled to a communication network, the network element comprising:

a plurality of switching units configured to independently implement a Spanning Tree Protocol (xSTP) processing, the plurality of switching units including a first switching unit and a second switching unit, wherein:

the first switching unit is configured to implement xSTP processing by calculating a first external spanning tree of a bridging domain that includes the network element;

the second switching unit is configured to implement xSTP processing independently from the first switching unit by independently calculating a second external spanning tree of the bridging domain;

the plurality of switching units are configured to communicate control information therebetween to facilitate distributed xSTP processing by the plurality of switching units, the network element acting as a single bridge to other network elements in the bridging domain.

20. The network element of claim 19, wherein the network element comprises a packet optical networking platform and each of the plurality of switching units comprises a line card.

21. The network element of claim 19, further comprising a control plane that couples the plurality of switching units together, wherein the control plane comprises an Ethernet network.

* * * * *